April 7, 1970 R. A. THORPE 3,505,666
TRACKING LIGHT PEN
Filed Oct. 3, 1966

INVENTOR
ROBERT A. THORPE

ATTORNEY

United States Patent Office 3,505,666
Patented Apr. 7, 1970

3,505,666
TRACKING LIGHT PEN

Robert A. Thorpe, Poughkeepsie, N.Y., assignor to International Business Machines Corporation, Armonk, N.Y., a corporation of New York
Filed Oct. 3, 1966, Ser. No. 583,682
Int. Cl. G08c 9/06
U.S. Cl. 340—324       8 Claims

ABSTRACT OF THE DISCLOSURE

A light pen tracking system for manipulating data on a CRT display under operator control includes an array of light detecting elements for causing a pattern or spot of light on the screen of a cathode ray tube display to follow movement of an external light transducer. A logic system under control of the light detector outputs controls digital deflection counters to cause the beam to move in a direction corresponding to the relative location of the light sensors whereby the spot follows the transducer.

---

The present invention relates to display systems and techniques and more particularly to a light pen tracking system used with a cathode ray tube display.

In certain applications such as image processing or graphic display systems, a CTR display with light pen tracking capabilities when combined with a data processor is recognized as a creative and versatile tool for certain operations such as computer aided design. Light pen tracking may be defined as the capability of an object or point of light displayed on the CRT screen to follow the movement of an external light transducer. Such operations are uniquely desirable in operator controlled design, for example, where it is desired to sketch or modify an existing design which is immediately available for viewing by the operator. One method of light pen tracking known in the art involves the use of special symbols composed to a pattern of dots or lines on the screen of the CRT. A light transducer containing a photodetector element is placed about the pattern and the pattern made to move in the direction of the pen travel by logical interpretations of the signals received from the pen as a result of whether all, part, or none of the pattern is within the field of view of the light pen. These logical interpretations generate control signals which modify the deflection of the CRT by updating the deflection registers to move the tracking symbol to conform to the movement of the transducer. As the symbol is moved, the display may be unblanked and the symbol drawn on the screen caused to conform to the motion of the transducer. An example of such a system is shown in copending application Ser. No. 422,844, "Display Tracking System" filed by A. C. O'Hara, Jr., Dec. 31, 1964, now U.S. Patent 3,337,860 and assigned to the assignee of the instant invention.

Among the problems associated with light pen tracking techniques of the above-described type is the requirement of continuous regeneration of the tracking symbol as well as timing circuit complexities attendant with the association of light pen responses with specific portions of the tracking character. To provide tracking at rates normally associated with pen motion by human operators (10–20 inches/second), conflicting requirements develop for the CRT phosphor. Since the light pen detection operates during regeneration of the point or symbol being tracked, it is desired to provide for rapid time discrimination of the specific portions of the symbol in order to maintain high regeneration rates. Associated with this requirement is the need for short persistance phosphor characteristics in order that the pen transducer be able to discriminate specific portions of the tracking symbol in time. However, a long persistance phosphor is generally preferred for display, since it minimizes flicker while viewing regenerated displays. This conflict is resolved in known light pen tracking systems by use of the low persistance phosphor to obtain the necessary rapid time discrimination required for a dynamic display.

In accordance with the present invention, there is provided an improved light pen tracking system which does not require a tracking symbol and may utilize long persistance phosphor for flicker-free display of images. A light pen using a plurality of photo-sensors disposed in a substantially orthogonal relationship is employed, each of the photo-sensors being associated with an optical fiber made of glass, quartz, plastic or other transparent or selectively transparent substances. The fibers are associated with arbitrarily defined zones having the light detectors oriented to detect within each zone. In the preferred embodiment herein described, four light sensors disposed in a horizontal and vertical pair configuration are employed, each light sensor having a very narrow viewing angle and arranged to provide orientation to some reference. A fiber optics bundle is employed where those fibers associated with the arbitrarily selected zones are separated at the other end of the pen and a diode light detector placed in front of each zone. If the display pattern is a point of light, the pen would detect the light at one or more of the indicated zones and generate control signals for the tracking logic for repositioning the CRT beam, if necessary, in accordance with movement of the light pen. The beam can be left on or unblanked continuously, since the detection no longer involves time but only positional information, permitting a substantial saving in the control hardware. Also, circuit complexity is substantially reduced since a long persistance phosphor may be employed because high regeneration and time discrimination rates for updating are not required.

Accordingly, a primary object of the present invention is to provide an improved light pen tracking system.

Another object of the present invention is to provide an improved light pen.

A further object of the present invention is to provide an improved multiple light sensor pen using fiber optics techniques.

Another object of the present invention is to provide an improved light pen tracking system using a partitioned set of fiber optic detectors.

Still another object of the present invention is to provide an improved light pen tracking system using a partitioned set of fiber optic detectors and control logic responsive to the detection pattern interpretation to reposition a spot of light in conformity with light pen movement.

The foregoing and other objects, features and advantages of the invention will be apparent from the following more particular description of a preferred embodiment of the invention, as illustrated in the accompanying drawings.

Figure 2:
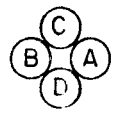
FIGURE 2 illustrates the spatial relationship between the light sensors employed in the present invention.
Figure 1:
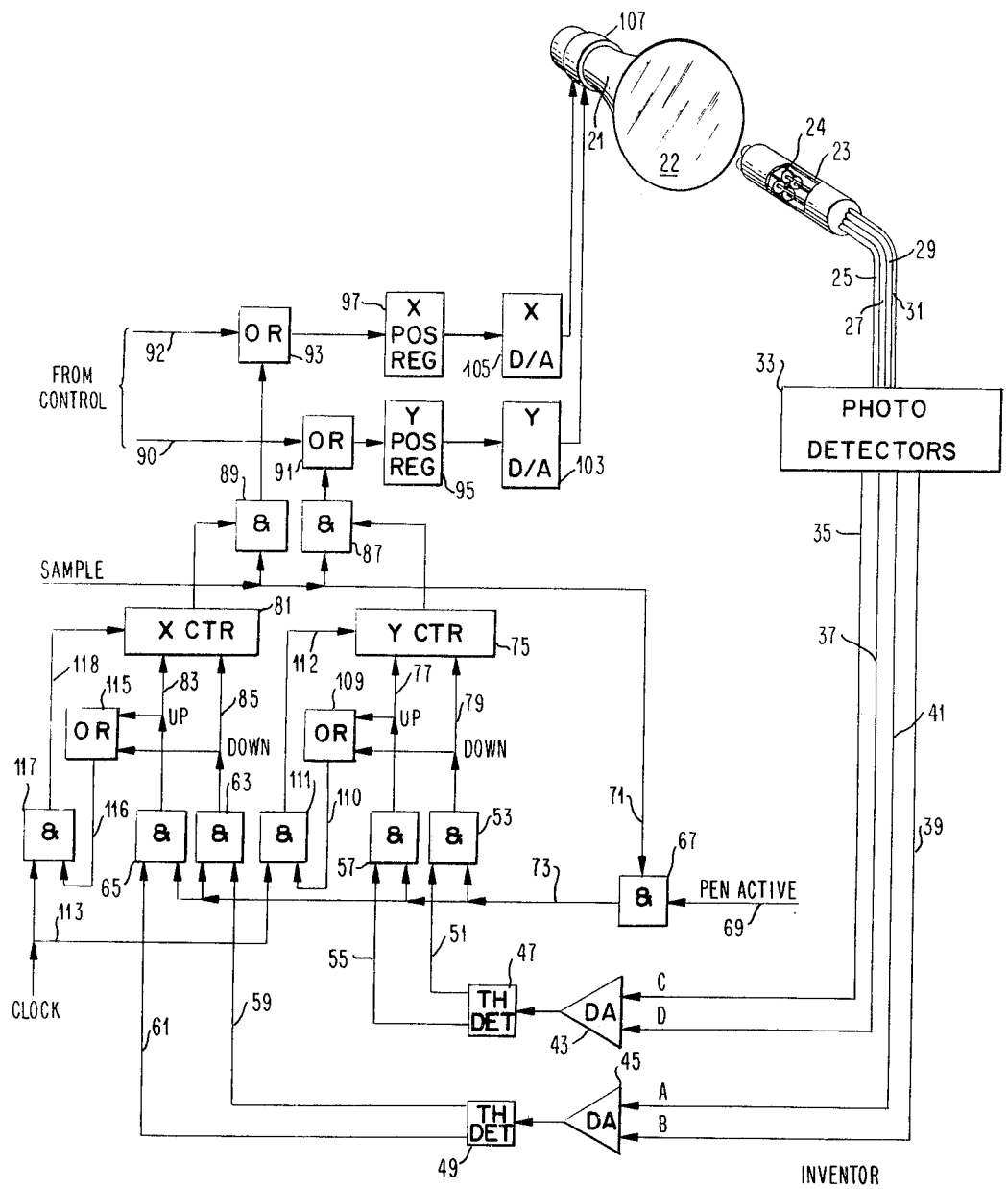
FIGURE 1 illustrates in block form the overall light pen tracking system of the present invention.
Figure 1:

Referring now to the drawings and more specifically to FIGURE 1 thereof, there is illustrated in block logical form a light pen tracking system in accordance with the present invention. As is well known in the art, a light pen technique in the tracking mode senses and follows pen movement by a series of sequential probes of the relative visual position of the field of view of the light pen in the overall image, as contrasted with the pointing mode, which associates the instant of pen response with an item in the display file. Associated with cathode ray tube 21 and screen 22 is a light pen 23. Light pen 23 includes a set of four photo-sensors 24 arrayed in orthogonal pairs as shown in FIG. 2, the horizontal pairs being identified as A, B and the vertical pairs as C, D. In the ensuing description, the light spot or symbol used in light tracking is designated "target." Essentially, light pen 23 comprises four independent light transducers which are selectively actuated by generation or regeneration of a spot of light on cathode ray tube screen 22 within the field of view of the associated light transducers. The light transducers transmit a light signal indicative of the target detection through associated fiber optic bundles 25, 27, 29 and 31 to a group of photo detectors shown as block 33. As is well known in the art, fiber optics normally comprise glass fibers clad with an optical glass of lower refractive index to favor internal reflection and thus minimize transmission losses through the side walls. The basic structure of the fiber optics transducer arrangement in the instant invention employs an array of a plurality of light responsive and light transferring fiber bundles. Each fiber has a characteristic spectral transmittance, i.e., low absorption over a suitable portion of the optical spectrum, the transmittance characteristics of the four bundles being substantially identical. Such devices are well known in the art and are employed in the instant invention primarily for their light transmission capabilities. The photo detectors 33 effectively convert the light output emanating from the four fiber optics bundles to corresponding electrical signals on lines 35, 37 and 39, 41 respectively. Thus, the outputs on lines 35, 37 and 39, 41 indicate the particular zone or zones in the field of view of the light pen on which the light has been detected. The orthogonal light transducers employed in the preferred embodiment are shown and described as disposed along vertical and horizontal zones, lines 35, 37 representing the output from the vertical zones C and D, while lines 39 and 41 represent the output from the horizontal zones A and B. The output lines representing the vertical and horizontal zones are applied through difference amplifiers 43 and 45 to threshold detection circuits 47 and 49 respectively. The threshold detectors 47 and 49 may comprise any well known circuit which will respond to three possible output conditions from the associated differential amplifiers, the output signal of the detectors designating the detection pattern of its associated pair of photo detectors.

While the relative fields of view of the four photo detectors are shown in FIGURE 2, it will be appreciated that in practice the fields could overlap such that a single target could be detected by the four detectors. As more fully described hereinafter, the light pen tracking system of the present invention is capable of discriminating and updating with a directional tolerance of 45 degrees. Tabulated below is the truth table which identifies the relationship between pen position relative to the CRT spot or "target" detected by photo detectors A, B, C, D. With respect to either pair, the target may be detected by one zone or the other, neither or both. The truth table identifies 14 of the 16 possible combinations. The 0011 or 1100 condition cannot exist since the target cannot be detected by both sensors of a pair and undetected by either element of the other pair.

In Table I below, a binary 1 signifies the target has been detected by its identified photo detector A, B, C or D, while a binary 0 indicates no detection. The column labeled pen position indicates the relative direction of the pen with respect to the photo detectors, which is opposite to the correction required to cause the target to follow this movement of the four element light transducer. Since the A, B and C, D output signals are applied to differential amplifiers, the 00 and 11 condition of either pair are the same for corresponding permutations in the other pair. For example, both the 0001 and 1101 combinations designate that the pen position in Up with respect to the target, the 0010 and 1110 combinations that the pen is Down and so forth. The angular designations of pen position are with respect to a vertical line drawn through the center of the fields of detectors C, D, with the North as the zero reference position. The manner in which the truth table is converted to move the target to correspond to the position of the pen is more fully described hereinafter.

TABLE I

| A | B | C | D | Pen Position |
|---|---|---|---|---|
| 0 | 0 | 0 | 0 | Off Target. |
| 0 | 0 | 0 | 1 | Up. |
| 1 | 1 | 0 | 1 | Up. |
| 0 | 0 | 1 | 0 | Down. |
| 1 | 1 | 1 | 0 | Do. |
| 0 | 1 | 0 | 0 | Right. |
| 0 | 1 | 1 | 1 | Do. |
| 1 | 0 | 0 | 0 | Left. |
| 1 | 0 | 1 | 1 | Do. |
| 0 | 1 | 0 | 1 | 45°. |
| 0 | 1 | 1 | 0 | 135°. |
| 1 | 0 | 1 | 0 | 225°. |
| 1 | 0 | 0 | 1 | 315°. |
| 1 | 1 | 1 | 1 | On target. |

Referring back to FIGURE 1, threshold detector 47 responds to the output from difference amplifier 43, which is controlled by the vertical detectors C, D, while threshold detector 49 responds to the output from difference amplifier 45, which is controlled by the horizontal detectors A, B. The output of the threshold detectors will be control signals to move the light spot Up or Down, Right or Left in accordance with the relationship of the light spot with the light pen as indicated by the the photo detectors. One output from the threshold detector 47 on line 51 will condition logical AND circuit 53, while the second output on line 35 will condition its associated AND circuit 57. If the light spot is detected by zone C but not D, on output is provided on line 51 to condition logical AND circuit 53; if the light spot is detected by zone D but not C, an output is provided on line 55 to condition logical AND circuit 57. The pair of horizontal detectors operate in a similar manner through difference amplifier 45 and threshold detector 49 such that an output on line 59 signifies detection by A, while an output on line 61 signifies detection by B. Detection by neither or both sensors in a pair are effectively cancelled in the difference amplifiers 43 and 45, and no output is provided. The output from lines 59 and 61 condition logical AND circuits 63 and 65 respectively.

During a light pen tracking operation, logical AND circuit 67 is normally conditioned by a pen active line 69, which may originate from a manually controlled switch. When a sample signal is applied on line 71, the resultant output from logical AND circuit 67 on line 73 samples logical AND circuits 53, 57, 63, and 65 and provides an output when one or the other of either pair is conditioned. The outputs from logical AND circuits 53 and 57 are applied to counter Y75, which effectively comprises a count up-count down counter which is conditioned to count up on an input on line 77 from AND circuit 57 and conditioned to count down by a signal on line 79 from AND circuit 53. Similarly, the X counter 81 has inputs 83 and 85 from its associated logical AND circuits 65 and 63 which conditions the counter to increment or decrement respectively. The outputs from logical AND circuits 53 and 57 are also applied to logical OR circuit 109. The output of the logical OR circuit 109 thus conditions the logical AND circuit 111 when either a count up or a count down condition exists. The other input to logical AND circuit 111 is a clock signal which appears on line 113. The output of logical AND circuit 11 is thus a series of clock pulses on line 112 which causes Y counter 75 to count up or count down depending on the condition of lines 77 and 79. In a similar manner, the outputs from logical AND circuits 63 and 65 are applied to logical OR circuit 115, the output of which appears on line 116 to condition logical AND circuit 117. The application of a clock signal on line 113 then causes output pulses to occur on line 118 which causes X counter 81 to count up or count down depending on the condition of lines 83 and 85. The outputs of the Y and X counters 75 and 81 condition logical AND circuits 87 and 89, which when strobed by sample line 71 apply their respective outputs through logical OR circuits 91 and 93 to the Y and X position registers 95 and 97 respectively. The second input to logical OR circuits 91 and 93 are control signals on lines 90 and 92 which initially position the tracking spot or symbol at the starting location for the pen tracking operation. The output of the position registers 95 and 97 are also applied to digital to analog decoders 103 and 105, where the digital signals are converted to corresponding analog potentials which in turn are applied to the corresponding windings of magnetic yoke 107. While the X and Y counters, position registers, decoders and interconnected control signals are shown in single block form in the interest of clarity, it will be appreciated that in practice the size of the digital word employed will vary in size in accordance with the data processing system with which it is associated. An example of a 10 bit system is shown in the aforenoted copending application Ser. No. 422,844.

In operation, it will be assumed that initially the counters and registers have been cleared or reset prior to operation. Initially, the target will be generated on the CRT screen 22 by applying the appropriate deflection signals to lines 90 and 92 from a control medium such as a data processor. To sketch with the light pen, the light pen is placed in front of the target which when detected by one or more of the zones indicated, provides the necessary feedback to the tracking logic described supra for repositioning tne CRT beam if necessary. The detection of light is transmitted to the photo detectors which in turn will generate corresponding electrical signals to be applied to difference amplifiers 43 and 45. The output of the difference amplifiers 43 and 45 is applied to control the stepping of the counters 75 and 81 up or down, the counters in turn controlling the movement of the spot of light up or down, right or left in accordance with the correction voltage controlled by the detection pattern sensed by the four photocells.

With respect to timing considerations, it will be understood that in a display system of the type herein described, only a portion of the total cycle time of the system will be allocated for light pen operation. Within this allocated time, the sample line 71 will have a doration dictated primarily by the physical constraints on the movement of the light pen. Generally speaking, the sample line could be activated prior to light pen detection to condition the appropriate logic circuits for activation by the light pen responses. The only requirement imposed on light pen movement is that in order to provide the capability for repositioning the dot as the pen is moved, the detection pattern orientation must be maintained. This is not a particularly stringent requirement in that the preferred embodiment of the present invention using four photocells is capable of discriminating and updating with a directional tolerance of 45 degrees. The only requirement of the operator is that the pen be maintained within a tolerance of plus or minus 22.5 degrees which can be readily handled by the design of the pen. In a 10 bit system of the type aforenoted, the display might cover a 12 x 12 inch image area which would be divided into 1024 x 1024 raster units. For a display of this size, the size of one raster unit will be approximately .012 inch. The rate of movement of the light pen would be correlated with the incremental motion of the X and Y deflection counters 75 and 81 in accordance with the allowable velocity of pen movement, which as previously indicated would be 10–20 inches per second. These considerations represent a matter of design, one specific example being indicated above.

While a preferred embodiment of the subject invention has been described above, it is obvious that other patterns of elements having more or less photo detectors could be employed. Additionally, components other than fiber bundles and diode light detectors shown in the preferred embodiment could be used in an implementation of the present invention. The present invention eliminates the requirement for a tracking pattern, permits use of long persistance phosphor for a substantially flicker-free display and transfers system control from the tracking pattern logic to the light pen.

What is claimed is:

1. In a light pen tracking system for controlling the generation of a cathode ray display, the combination comprising
   a cathode ray tube,
   means for generating and displaying a target indicia on the screen of said cathode ray tube,
   a light transducer,
   said light transducer comprising a plurality of photo sensing devices,
   said plurality of photo sensing devices having optical fields capable of simultaneously and selectively detecting said target indicia in accordance with the relative positions of said light transducer and said target indicia,
   and means responsive to the output of said photo sensing devices for generating control signals to modify the position of said targe indicia to correspond to the position of said light transducer.

2. A device of the character in claim 1 wherein said means for generating control signals to modify the position of said target indicia comprises a logical configuration responsive to said control signals for generating deflection modification signals whereby said target indicia is enabled to follow the motion of said light transducer.

3. A device of the character claimed in claim 2 further including intensity control means for maintaining said cathode ray tube beam in an unblanked condition while said target indicia follows the motion of said light transducer.

4. A device of the character claimed in claim 1 wherein said light transducer includes a plurality of fiber optic bundles for transmitting the light detected by said photo sensing devices.

5. A light pen tracking system comprising in combination
   a cathode ray tube having beam deflection means and intensity control means,
   means responsive to a beam deflection signal for displaying a target indicia on the screen of said cathode ray tube,
   a light transducer comprising a plurality of photo sensing devices aligned in spatial orientation with respect to a reference position,
   said photo sensing devices having optical fields of view adapted to simultaneously and selectively view said target indicia and generate light signals indicative of detection thereof,
   means for converting said light signals into electrical signals indicative of the relative position of said target indicia with respect to said light transducer,
   said control means operatively coupled to said beam deflecting means and responsive to said electrical signals for modifying said beam deflection signals whereby said target indicia is caused to follow the movement of said light sensor.

6. A device of the character defined in claim 5 wherein said control means comprises a logical configuration for interpreting the motion of said light pen as a function of whether said target indicia is detected by none, some or all of said photo sensing devices.

7. A device of the character claimed in claim 6 wherein said logical configuration includes difference amplifiers selectively coupled between the output of said converting means and said beam deflection means for generating signals representative of the orthogonal displacement of said light transducer and said target indicia.

8. A device of the character claimed in claim 5 wherein said sensing devices include fiber optical bundles for transmitting the detected signals to said converting means.

References Cited

UNITED STATES PATENTS

| | | | |
|---|---|---|---|
| 3,028,500 | 4/1962 | Wallmark | 340—324.1 |
| 3,089,918 | 5/1963 | Graham | 340—324.1 |
| 3,182,291 | 5/1965 | Vassimbene | 250—227 |
| 3,337,860 | 8/1967 | O'Hara. | |
| 3,394,366 | 7/1968 | Dye | 340—324.1 |

OTHER REFERENCES

IBM Disclosure, Optical Displacement Measuring Device, Hamrick et al., vol. 4, No. 7, p. 85, December 1961.

JOHN W. CALDWELL, Primary Examiner

M. M. CURTIS, Assistant Examiner

U.S. Cl. X.R.

250—217, 227